(12) United States Patent
Vanderlip et al.

(10) Patent No.: US 11,773,962 B1
(45) Date of Patent: Oct. 3, 2023

(54) ELECTRIC DRIVE UNIT WITH INTEGRATED, VARIABLE FLOW, LOW-PRESSURE OIL COOLING SYSTEM

(71) Applicant: BorgWarner Inc., Auburn Hills, MI (US)

(72) Inventors: Matthew Vanderlip, Waterloo (CA); Michael Bradfield, Anderson, IL (US); Steven Hayslett, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/705,433

(22) Filed: Mar. 28, 2022

(51) Int. Cl.
| | |
|---|---|
| F16H 57/04 | (2010.01) |
| F16H 57/02 | (2012.01) |
| H02K 7/10 | (2006.01) |
| H02K 9/19 | (2006.01) |
| F16H 57/037 | (2012.01) |
| H02K 7/116 | (2006.01) |
| F16H 57/031 | (2012.01) |

(52) U.S. Cl.
CPC ....... *F16H 57/0476* (2013.01); *F16H 57/037* (2013.01); *F16H 57/0424* (2013.01); *F16H 57/0436* (2013.01); *F16H 57/0443* (2013.01); *F16H 57/0471* (2013.01); *H02K 7/116* (2013.01); *H02K 9/19* (2013.01); *F16H 57/031* (2013.01); *F16H 57/0417* (2013.01); *F16H 57/0483* (2013.01); *F16H 2057/02034* (2013.01)

(58) Field of Classification Search
CPC .. F16H 57/031; F16H 57/037; F16H 57/0417; F16H 57/0424; F16H 57/0436; F16H 57/0443; F16H 57/0471; F16H 57/0476; F16H 57/0483; F16H 2057/02034; H02K 7/116; H02K 9/19
See application file for complete search history.

(56) References Cited

U.S. PATENT DOCUMENTS

| | | | | |
|---|---|---|---|---|
| 4,418,777 A | * | 12/1983 | Stockton | ............. F16H 57/0413 184/6.12 |
| 5,821,653 A | * | 10/1998 | Kinto | ....................... B60K 1/00 310/58 |
| 8,167,758 B2 | | 5/2012 | Downs et al. | |
| 8,508,090 B2 | * | 8/2013 | Tanaka | ..................... H02K 9/19 192/113.32 |
| 8,884,566 B2 | | 11/2014 | Cao et al. | |

(Continued)

FOREIGN PATENT DOCUMENTS

| | | |
|---|---|---|
| JP | 2011004487 A | 1/2011 |
| JP | 2012237362 A | 12/2012 |

(Continued)

OTHER PUBLICATIONS

International Search Report and Written Opinion for PCT/US2023/016570 dated Aug. 1, 2023.

*Primary Examiner* — Adam D Rogers
(74) *Attorney, Agent, or Firm* — Reising Ethington P.C.

(57) ABSTRACT

An electric drive unit with an electric motor, a differential assembly, a transmission that transmits rotary power from the electric motor to the differential assembly, and a pair of output shafts that are rotatably coupled to respective differential output members of the differential assembly. The electric drive unit is configured to provide low cost, reliable cooling and/or lubrication to various components of the electric drive unit.

19 Claims, 12 Drawing Sheets

(56) References Cited

U.S. PATENT DOCUMENTS

| | | |
|---|---|---|
| 8,896,249 B2 | 11/2014 | Cao et al. |
| 9,306,433 B2 | 4/2016 | Sten et al. |
| 9,425,725 B2 | 8/2016 | Melanson |
| 9,856,971 B2 * | 1/2018 | Mikami ................ F16H 57/045 |
| 10,476,351 B2 * | 11/2019 | Francis ................. H02K 7/006 |
| 10,630,140 B2 * | 4/2020 | Pritchard ............. B60K 17/046 |
| 11,079,004 B2 * | 8/2021 | Ishikawa ............ F16H 57/0476 |
| 11,111,985 B1 * | 9/2021 | Francis ................. B60K 17/16 |
| 11,274,740 B2 * | 3/2022 | Wilson ................ F16H 57/0447 |
| 11,279,218 B2 * | 3/2022 | Hibino ................. F16H 57/082 |
| 2001/0043048 A1 | 11/2001 | Tajima et al. |
| 2009/0127954 A1 | 5/2009 | Mogi |
| 2010/0109584 A1 | 5/2010 | Kwon et al. |
| 2010/0237817 A1 | 9/2010 | Liu et al. |
| 2010/0264861 A1 | 10/2010 | Basic et al. |
| 2010/0320763 A1 | 12/2010 | Li et al. |
| 2016/0202296 A1 | 7/2016 | Costanzo et al. |
| 2022/0388391 A1 * | 12/2022 | Gowrisankar ......... B60K 17/02 |

FOREIGN PATENT DOCUMENTS

| | | |
|---|---|---|
| JP | 2020058148 A | 4/2020 |
| JP | 2022012141 A | 1/2022 |
| WO | WO2018030343 A1 | 2/2008 |

* cited by examiner

ELECTRIC DRIVE UNIT WITH INTEGRATED, VARIABLE FLOW, LOW-PRESSURE OIL COOLING SYSTEM

FIELD

The present disclosure relates to an electric drive unit.

BACKGROUND

This section provides background information related to the present disclosure which is not necessarily prior art.

Electric drive units incorporate an electric motor, a transmission and a differential assembly into a single component that is relatively easy for an original equipment manufacturer to integrate into a vehicle. Original equipment manufacturers are increasingly interested in electric drive units, not only as a means for transitioning away from conventional drivelines utilizing an internal combustion engine as the sole power source for propulsive power, but also as a convenient and relatively low cost means for electrifying a vehicle driveline.

The electric motor of an electric drive unit can develop a significant amount of heat during the operation of the electric drive unit. Various concepts have been developed to cool the electric motor of an electric drive unit. These concepts typically employ a lubricant that is routed through the rotor and stator of the electric motor under relatively high pressure to cool the electric motor. Additionally, the high pressure lubricant is also employed to lubricate various components of the electric drive unit, such as various bearings. One drawback to these concepts concerns their relative complexity and cost. Accordingly, there is a need in the art for an electric drive unit having a cooling and lubrication system that is less complex and costly while providing robust and reliable cooling and lubrication.

SUMMARY

This section provides a general summary of the disclosure, and is not a comprehensive disclosure of its full scope or all of its features.

In one form, the present disclosure provides an electric drive unit that includes a housing assembly, an electric motor, a differential assembly, first and second output shafts, a transmission and a fluid pump. The housing assembly defines a first cavity, a second cavity, a sump and an upper reservoir. The sump is coupled in fluid communication with the first cavity, while the upper reservoir is spaced apart from the sump and the first cavity. The electric motor is received in the first cavity and includes a stator, a rotor and a motor output shaft. The stator has a stator core, which is fixedly coupled to the housing assembly, and a plurality of windings. The rotor is received within the stator and is rotatable about a rotational axis. The motor output shaft is coupled to the rotor for rotation therewith about the rotational axis. The differential assembly is disposed in the second cavity and includes a differential input member, which is rotatable relative to the housing assembly, and first and second differential output members that are rotatable relative to the differential input member. The first output shaft is coupled to the first differential output member for rotation therewith. The second output shaft is coupled to the second differential output member for rotation therewith. The transmission is received in the second cavity and is configured to transmit rotary power between the motor output shaft and the differential input member. The fluid pump is configured to draw a lubricant from the sump and provide a flow of the lubricant. At least a portion of the flow of the lubricant is discharged into the upper sump. The housing assembly defines a plurality of first lubricant supply galleries and a plurality of second lubricant supply galleries. Each of the first and second lubricant supply galleries is a conduit that permits lubricant in the upper reservoir to drain due to gravity to an associated component of the electric drive unit to lubricate and/or cool the associated component. The first lubricant supply galleries intersect the upper reservoir at an associated location that is less than or equal to a first height dimension, while the second lubricant supply galleries intersect the upper reservoir at a corresponding location that is greater than or equal to a second height dimension. The second height dimension is relatively larger/higher than the first height dimension.

In another form, the present disclosure provides an electric drive unit that includes a housing assembly, an electric motor, a differential assembly, first and second output shafts, a transmission and a lubricant. The housing assembly defines a first cavity, a second cavity and a sump. The electric motor is received in the first cavity and includes a stator, a rotor and a motor output shaft. The stator has a stator core, which is fixedly coupled to the housing assembly, and a plurality of windings. The rotor is received within the stator and is rotatable about a rotational axis. The motor output shaft is coupled to the rotor for rotation therewith about the rotational axis. The differential assembly is disposed in the second cavity and includes a differential input member, which is rotatable relative to the housing assembly, and first and second differential output members that are rotatable relative to the differential input member. The first output shaft is coupled to the first differential output member for rotation therewith. The second output shaft is coupled to the second differential output member for rotation therewith. The transmission is received in the second cavity and is configured to transmit rotary power between the motor output shaft and the differential input member. The lubricant is disposed in the sump and is configured to cool and/or lubricate components of the electric drive unit. The lubricant establishes a predetermined lubricant level in the sump when the electric drive unit is operated in a nominal orientation. The sump intersects the first cavity such that a portion of the stator is disposed in the lubricant in the sump. The predetermined lubricant level in the sump is spaced apart from the rotor so that the rotor does not spin through the lubricant in the sump when the electric drive unit is operated in the nominal orientation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
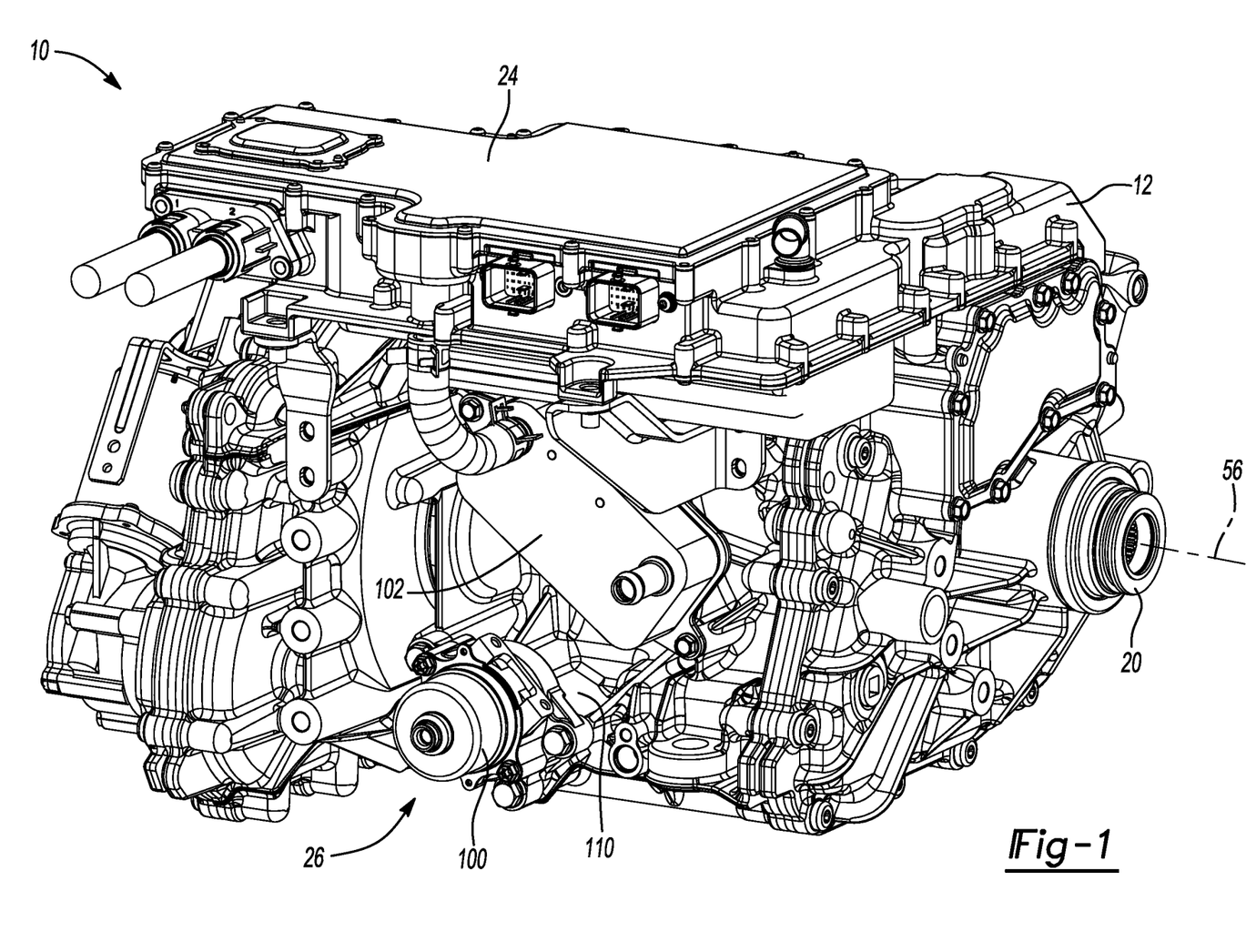
FIG. 1 is a perspective view of an exemplary electric drive unit constructed in accordance with the teachings of the present disclosure.
Figure 2:
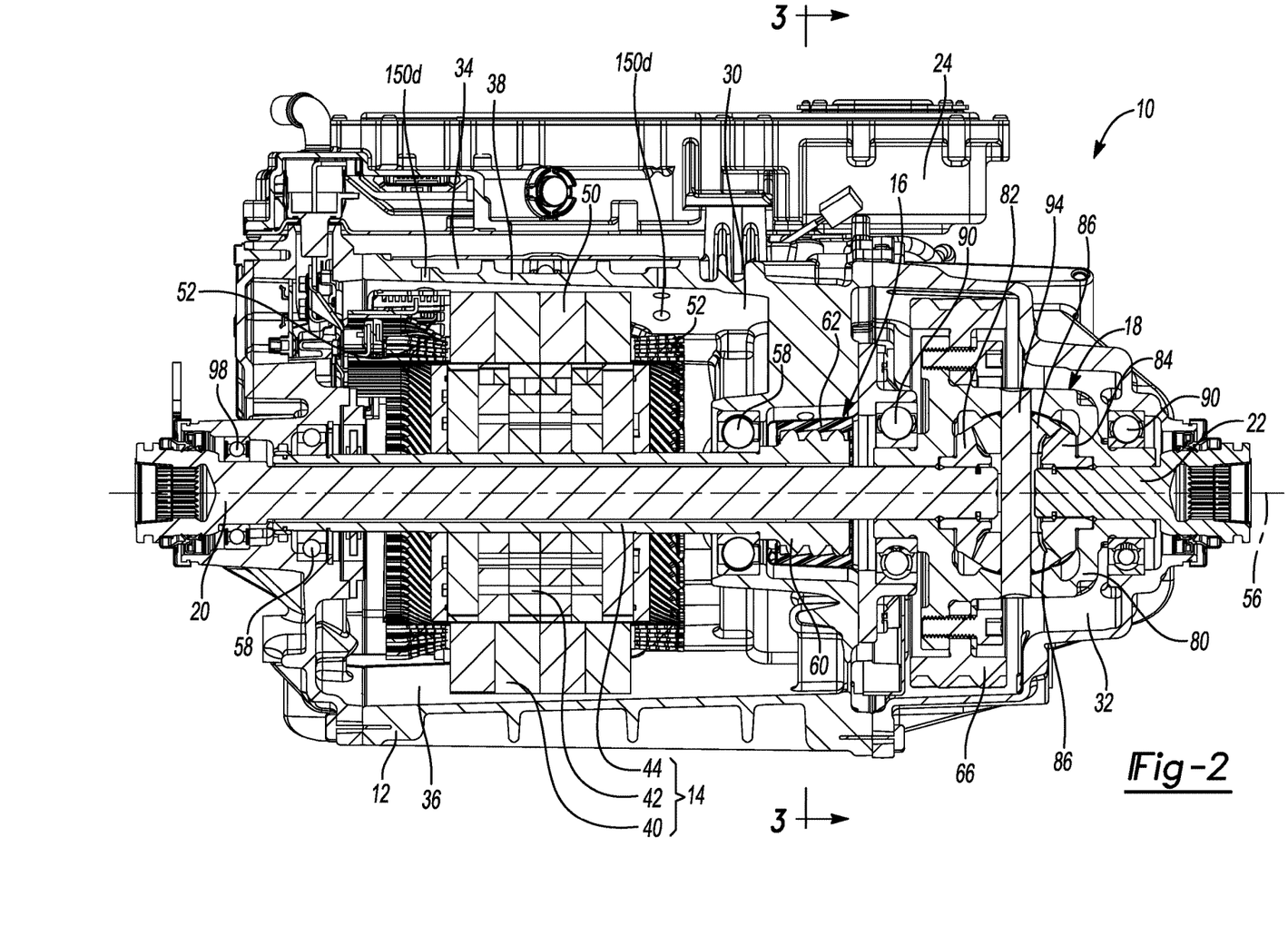
FIG. 2 is a longitudinal cross-sectional view of the electric drive unit of FIG. 1.

With reference to FIGS. 1 and 2, an exemplary electric drive unit constructed in accordance with the teachings of the present disclosure is generally indicated by reference numeral 10. The electric drive unit includes a housing assembly 12, an electric motor 14, a transmission 16, a differential assembly 18, first and second output shafts 20 and 22, respectively, a control unit 24 and a cooling and lubrication system 26.

In FIG. 2, the housing assembly 12 can be formed of a plurality of housing components or members that can be assembled to one another to form a first cavity 30, a second cavity 32, and an upper reservoir 34. The electric motor 14 can be received in the first cavity 30, while the transmission 16 and the differential assembly 18 can be received in the second cavity 32. The first cavity 30 can define a sump 36 that is configured to hold a quantity of a lubricant for use in lubricating and cooling various components of the electric drive unit 10. Lubricant supply passages (not specifically shown) can be formed through internal walls of the housing assembly 12 to fluidly couple the second cavity 32 to the sump 36. The upper reservoir 34 can be segregated from the first and second cavities 30 and 32 by a wall member 38. A cover C (FIG. 6) can be employed to close a top side of the upper reservoir 34. The cover C (FIG. 6) can be sealingly coupled to the housing assembly 12 via a plurality of threaded fasteners (not shown) and a gasket (not shown).

The electric motor 14 includes a stator 40, a rotor 42 and a motor output shaft 44. The stator 40 includes a stator core 50 and a plurality of field windings 52 that are wound about the stator core 50. The rotor 42 is received in the stator 40 and is rotatable relative to the stator about a rotational axis 56. The motor output shaft 44 is a hollow tubular structure that is received within and rotationally coupled to the rotor 42. The motor output shaft 44 can be supported for rotation relative to the housing assembly 12 by a pair of motor output shaft bearings 58.

Figure 3:
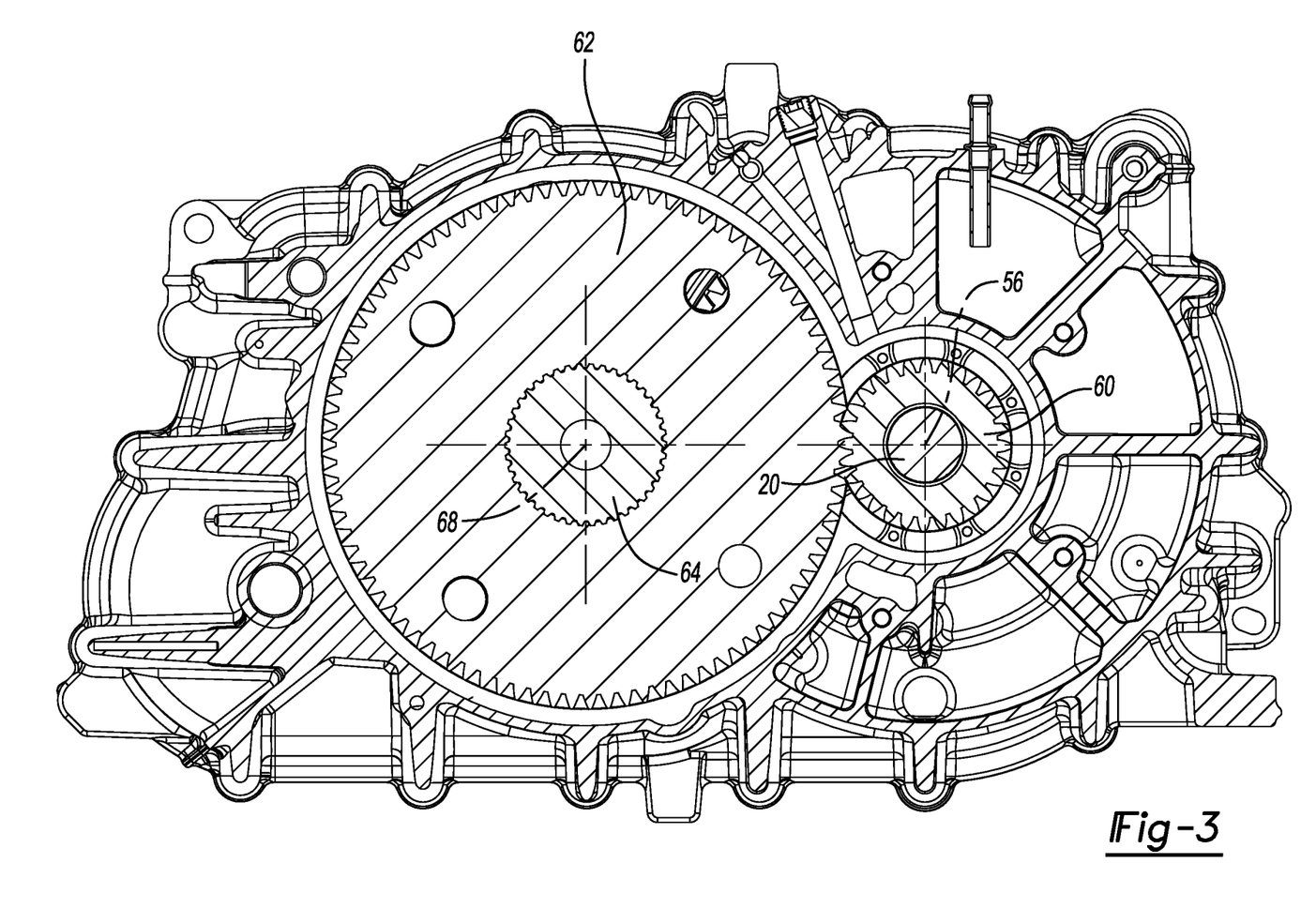
FIG. 3 is a section view taken along the line 3-3 of FIG. 2.
Figure 4:
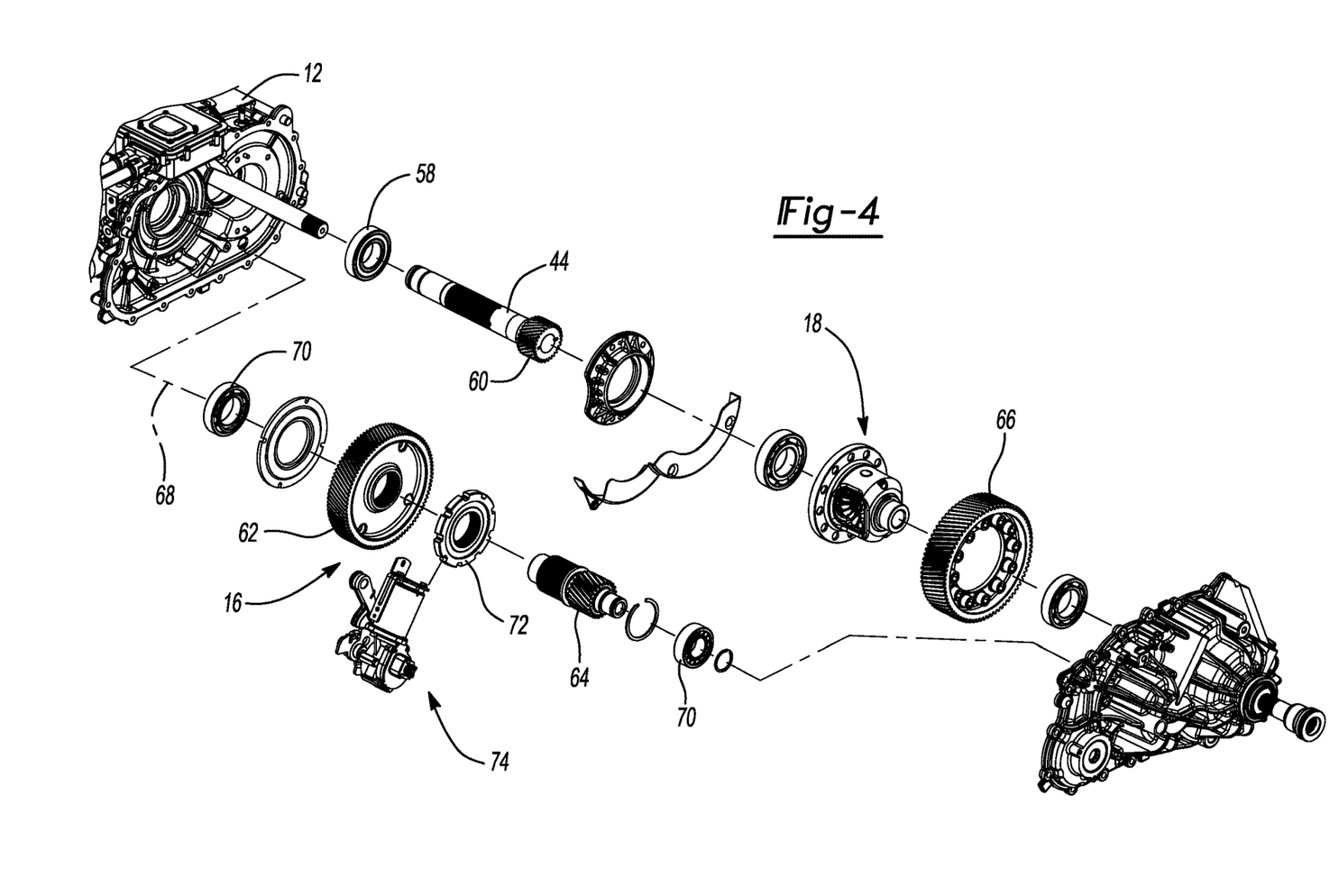
FIG. 4 is an exploded perspective view of a portion of the electric drive unit of FIG. 1, illustrating a transmission and a differential assembly in more detail.

With reference to FIGS. 2, 3 and 4, the transmission 16 is configured to transmit rotary power between the motor output shaft 44 and the differential assembly 18. In the example provided, the transmission 16 includes an input pinion 60, a first intermediate gear 62, a second intermediate gear 64, and an output gear 66. The input pinion 60 is coupled to the motor output shaft 44 for rotation therewith. The first intermediate gear 62 is rotatable about a second rotational axis 68 that is offset from the rotational axis 56 and is meshed with the input pinion 60. The second intermediate gear 64 is coupled to the first intermediate gear 62 for rotation therewith about the second rotational axis 68. The output gear 66 is meshed with the second intermediate gear 64 and is rotatable about the rotational axis 56. It will be appreciated that a set of intermediate gear bearings 70 can be employed to support the first and second intermediate gears 62 and 64 for rotation relative to the housing assembly 12. Optionally, a park-lock gear 72 can be rotationally coupled to the first and second intermediate gears 62 and 64. The park-lock gear 72 can be engaged by a pawl (not specifically shown) on a park-lock actuator 74, which is fixedly coupled to the housing assembly 12, to inhibit rotation of the first and second intermediate gears 62 and 64, and thereby inhibit rotation of the output gear 66.

With reference to FIGS. 2 and 4, the differential assembly 18 is configured to transmit rotary power from the output gear 66 of the transmission 16 to the first and second output shafts 20 and 22, as well as to permit speed differentiation between the first and second output shafts 20 and 22. In this regard, the differential assembly 18 can have a differential input member, which can be rotatably coupled to the output gear 66, and a pair of differential output members that are rotatable relative to the differential input member. The differential assembly 18 can be constructed in any desired manner, but in the example provided, the differential assembly 18 includes a differential case 80, first and second side gears 82 and 84, respectively, and a plurality of differential pinions 86. The differential case 80, which is the differential input member in the example provided, is coupled to the output gear 66 for rotation therewith about the rotational axis 56. A pair of differential bearings 90 can support the differential case 80 for rotation relative to the housing assembly 12. The first and second side gears 82 and 84 are received in the differential case 80 and are rotatable about the rotational axis 56 relative to the differential case 80. Each of the differential pinions 86 is meshed with the first and second side gears 82 and 84, is coupled to the differential case 80 for rotation therewith about the rotational axis 56, and is rotatable relative to the differential case 80 about an axis that is perpendicular to the rotational axis 56. In the example provided, the differential pinions 86 number two in quantity (i.e., there are two differential pinions 86 in the example provided) and are rotatably received on a cross-pin 94 that is mounted to the differential case 80.

The first output shaft 20 is received through a first axial end of the housing assembly 12, the motor output shaft 44, the input pinion 60 an axial end of the differential case 80 and is drivingly engaged to the first side gear 82. The second output shaft 22 is received through a second, opposite axial end of the housing assembly 12, a second, opposite axial end of the differential case 80, and is drivingly engaged to the second side gear 84. Retaining rings can be employed to axially secure the first and second output shafts 20 and 22 to the first and second side gears 82 and 84, respectively. If desired, an output shaft bearing 98 can be employed to support the first output shaft 20 and/or the second output shaft 22 for rotation about the rotational axis 56 relative to the housing assembly 12. In the example provided, only the first output shaft 20 is supported by an output shaft bearing 98.

Returning to FIGS. 1 and 2, the control unit 24 can include an inverter (not specifically shown), a motor controller (not specifically shown), power terminals (not specifically shown), and other controls hardware that are needed for providing electrical power to and controlling the operation of the electric motor 14 and the cooling and lubrication system 26. The control unit 24 can be mounted to an external side/surface of the housing assembly 12.

Figure 5:
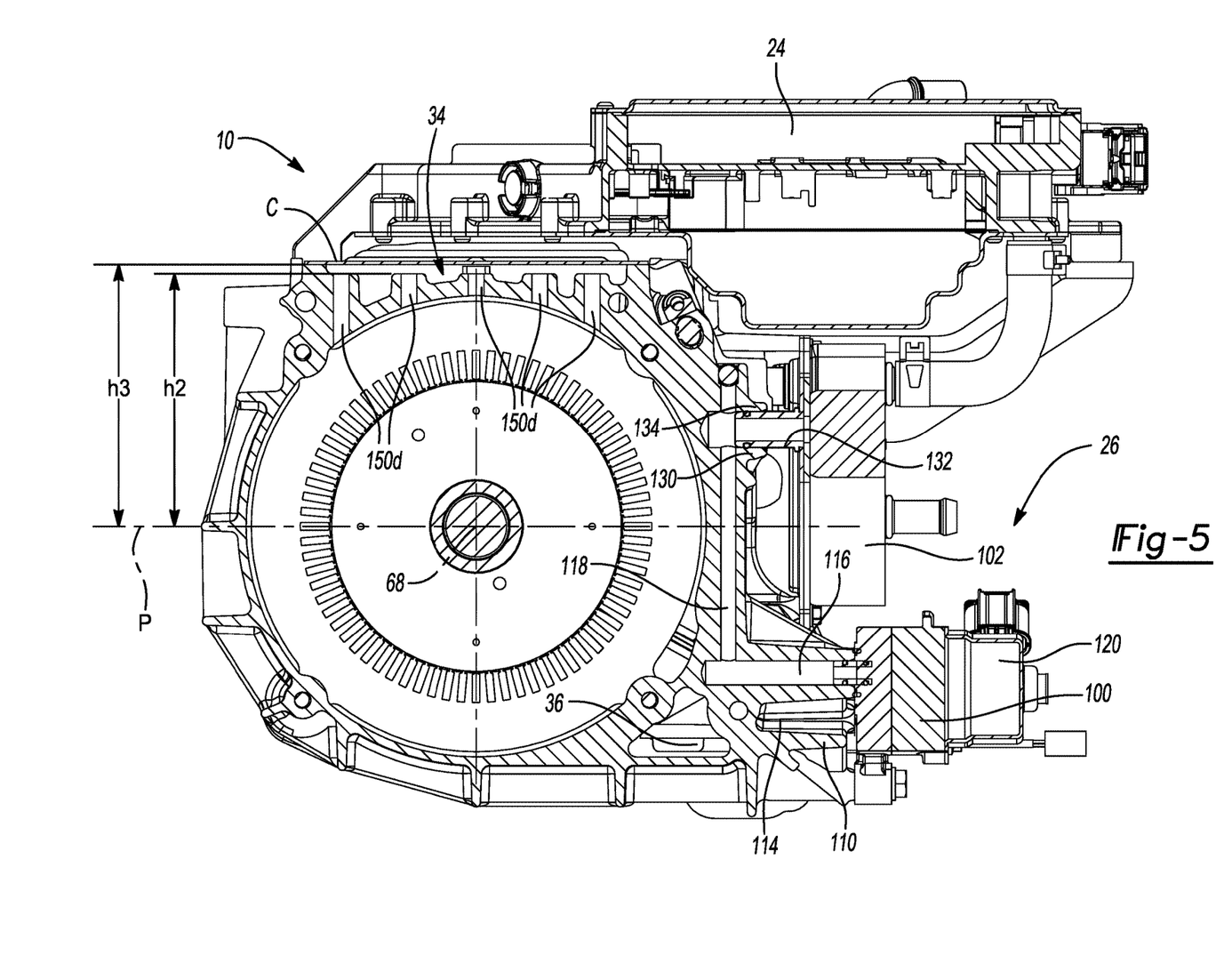
FIGS. 5 and 6 are lateral section views of the electric drive unit of FIG. 1 illustrating portions of a cooling and lubrication system in more detail.

With reference to FIGS. 1 and 5, the cooling and lubrication system 26 is configured to cool and lubricate various components of the electric drive unit 10 and includes a fluid pump 100 and a heat exchanger 102. The fluid pump 100 can be mounted to a pump mount 110 that is incorporated into the housing assembly 12. In the example provided, the pump mount 110 includes a fluid intake 114, which is configured to permit the fluid pump 100 to draw lubricant from the sump 36, and a fluid discharge 116 that is coupled in fluid communication to a first fluid gallery 118 in the housing assembly 12. The fluid pump 100 can be any type of pump, such as a gear motor pump, a vane pump and/or a g-rotor pump. The fluid pump 100 includes an electric motor 120 that is electrically coupled to (and controlled by) the control unit 24.

Figure 6:
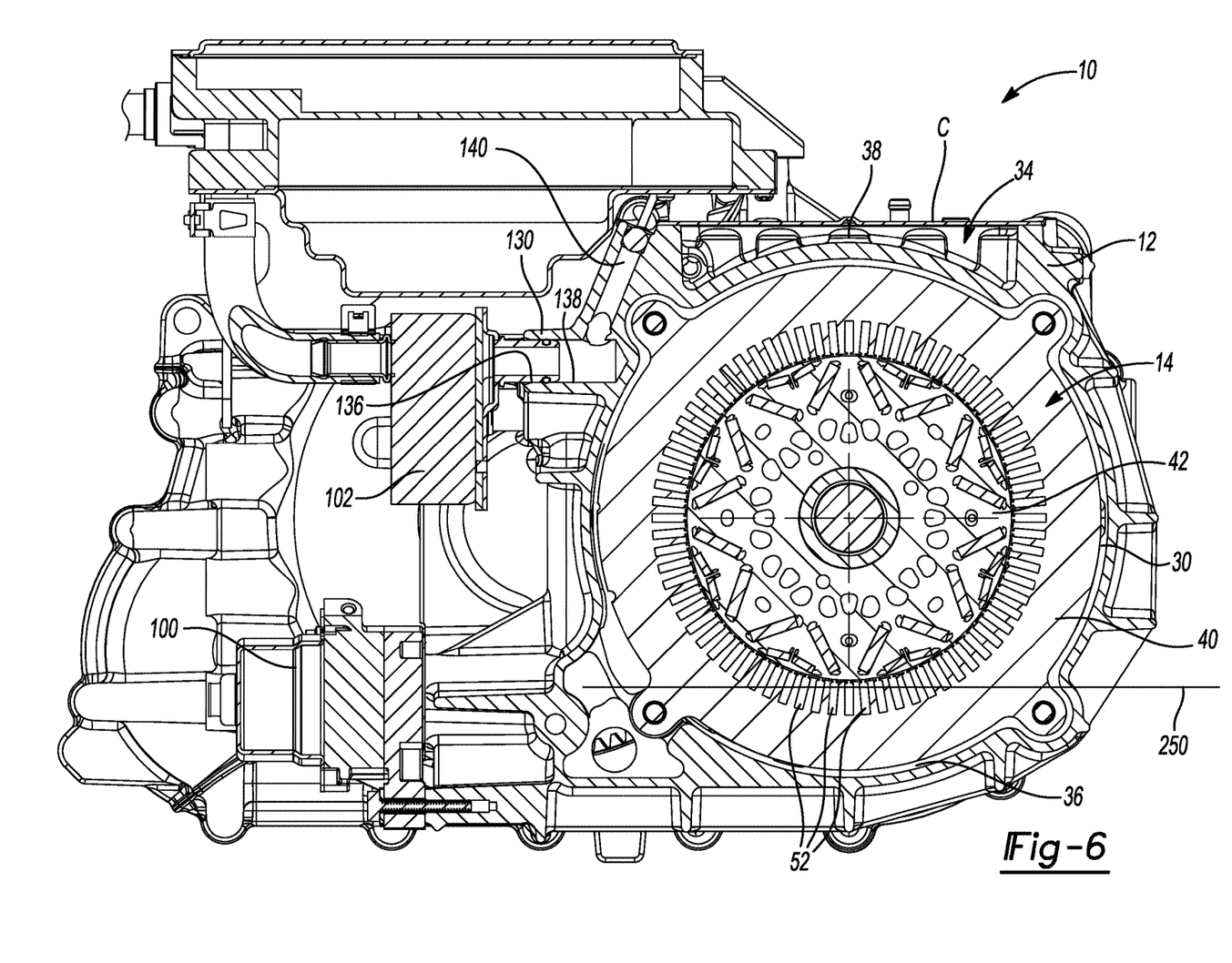

With reference to FIGS. 1, 5 and 6, the heat exchanger 102 can be mounted to a heat exchanger mount 130 that can be incorporated into the housing assembly 12. The heat exchanger 102 can have a first passage, which is configured to receive a flow of a first cooling fluid, such as water, therethrough, and a second passage that is configured to receive a flow of the lubricant that is discharged from the fluid pump 100. In the example shown, the heat exchanger includes an inlet 132, which is received into a first port 134 that is defined by the pump mount 110, and an outlet 136, which is received into a second port 138 that is defined by the pump mount 110. The first port 134 intersects and is in fluid communication with the first gallery 118. The second port 138 is in fluid communication with a second gallery 140 in the housing assembly 12.

The second gallery 140 is coupled in fluid communication to the upper reservoir 34. As will be discussed in more detail, below, a plurality of lubricant supply galleries are coupled in fluid communication to the upper reservoir 34 and dispense lubricant in the upper reservoir 34 to various components of the electric drive unit 10 to cool and/or lubricate those components. It is noted that the flow of lubricant from the upper reservoir 34 the various lubricant supply galleries is based on gravity rather than fluid pressure created by the fluid pump 100.

With reference to FIGS. 2 and 5 through 8, the upper reservoir 34 is contoured and the various lubricant supply galleries intersect the upper reservoir 34 in a manner that prioritizes the supply of lubricant to certain lubricant supply galleries over other lubricant supply galleries. The lubricant galleries 150*a*, 150*b* and 150*c* can intersect the upper reservoir 34 at height h1 from a horizontal plane P that is less than or equal to a first value, the lubricant galleries 150*d* can intersect the upper reservoir 34 from the horizontal plane P at a height h2 that is greater than or equal to a second value. The second value is greater than the first value and less than a third value corresponding to a height h3 of the cover C from the horizontal plane P. For example, the lubricant supply galleries 150*a*, 150*b* and 150*c* intersect the upper reservoir 34 at heights h1 that are relatively lower than the heights h2 at which the lubricant supply galleries 150*d* intersect the upper reservoir 34. In the example provided, the lubricant supply gallery 150*a* directs lubricant from the upper reservoir 34 to the motor output shaft bearing 58 and the output shaft bearing 98 on an end of the housing assembly 12 from which the first output shaft 20 extends, the lubricant gallery 150*b* directs lubricant from the upper reservoir 34 to the motor output shaft bearing 58 and the differential bearing 90 on an end of the housing assembly from which the second output shaft 22 extends, the lubricant supply gallery 150*c* directs lubricant from the upper reservoir 34 to the motor output shaft bearing 58 and the differential bearing 90 that are disposed closest to the input pinion 60 as well as to the intermediate gear bearings 70, while the lubricant supply galleries 150*d* are configured to dispense lubricant onto an associated axial end of the field windings 52 of the stator 40. Accordingly, lubrication and cooling of the components of the electric drive unit 10 that receive lubricant from the lubricant supply galleries 150*a*, 150*b* and 150*c* is prioritized over the lubrication and cooling of components of the electric drive unit 10 that receive lubricant from the lubricant supply galleries 150*d* due to the relatively lower height at which the lubricant supply galleries 150*a*, 150*b* and 150*c* intersect the upper reservoir 34 relative to the height at which the lubricant supply galleries 150*d* intersect the upper reservoir 34. Each of the lubricant supply galleries 150*a*, 150*b* and 150*c* can be sized in a desired manner to meter lubricant to drain to desired components at a predetermined rate when the upper reservoir 34 is full of lubricant. The predetermined drain rate for each of the lubricant supply galleries 150*a*, 150*b* and 150*c* can be established by a diameter of a portion of the lubricant supply gallery, or by an appropriately sized orifice that can be installed to the lubricant supply gallery. The lubricant supply galleries 150*d* can be sized to ensure that lubricant can drain from the upper reservoir at a desired rate, such as a rate that is sufficient to prevent pressurization of the lubricant in the upper reservoir when the upper reservoir 34 is full and each of the lubricant supply galleries 150*a*, 150*b* and 150*c* is discharging lubricant from the upper reservoir 34 at its predetermined rate. The lubricant supply galleries 150*d* can terminate at their upper ends in close proximity to the cover C of the upper reservoir to aid in maintaining even flow distribution to all of the lubricant supply galleries 150*a*, 150*b*, 150*c* and 150*d* when a vehicle equipped with the electric drive unit 10 undergoes dynamic vehicle maneuvers. Additionally or alternatively, a conventional means, such as one or more a baffles, can be employed in the upper reservoir 34 to limit the sloshing of lubricant in the upper reservoir 34 during dynamic vehicle maneuvers.

Figure 7:
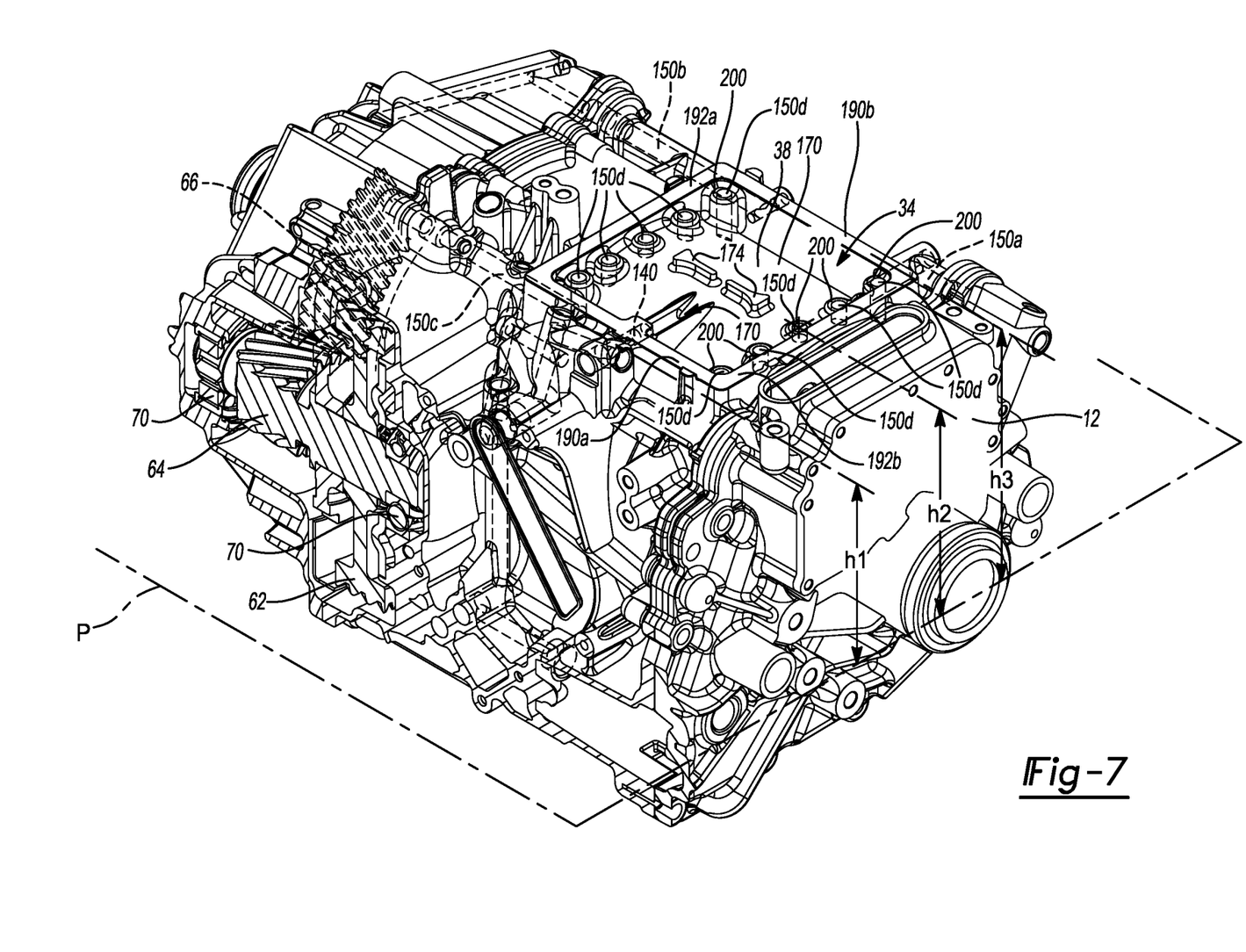
FIG. 7 is a perspective section view of a portion of the electric drive unit of FIG. 1 with the housing assembly broken away to better illustrate an upper reservoir in the housing assembly and various galleries and lubricant supply galleries that are coupled in fluid communication with the upper reservoir.
Figure 8:
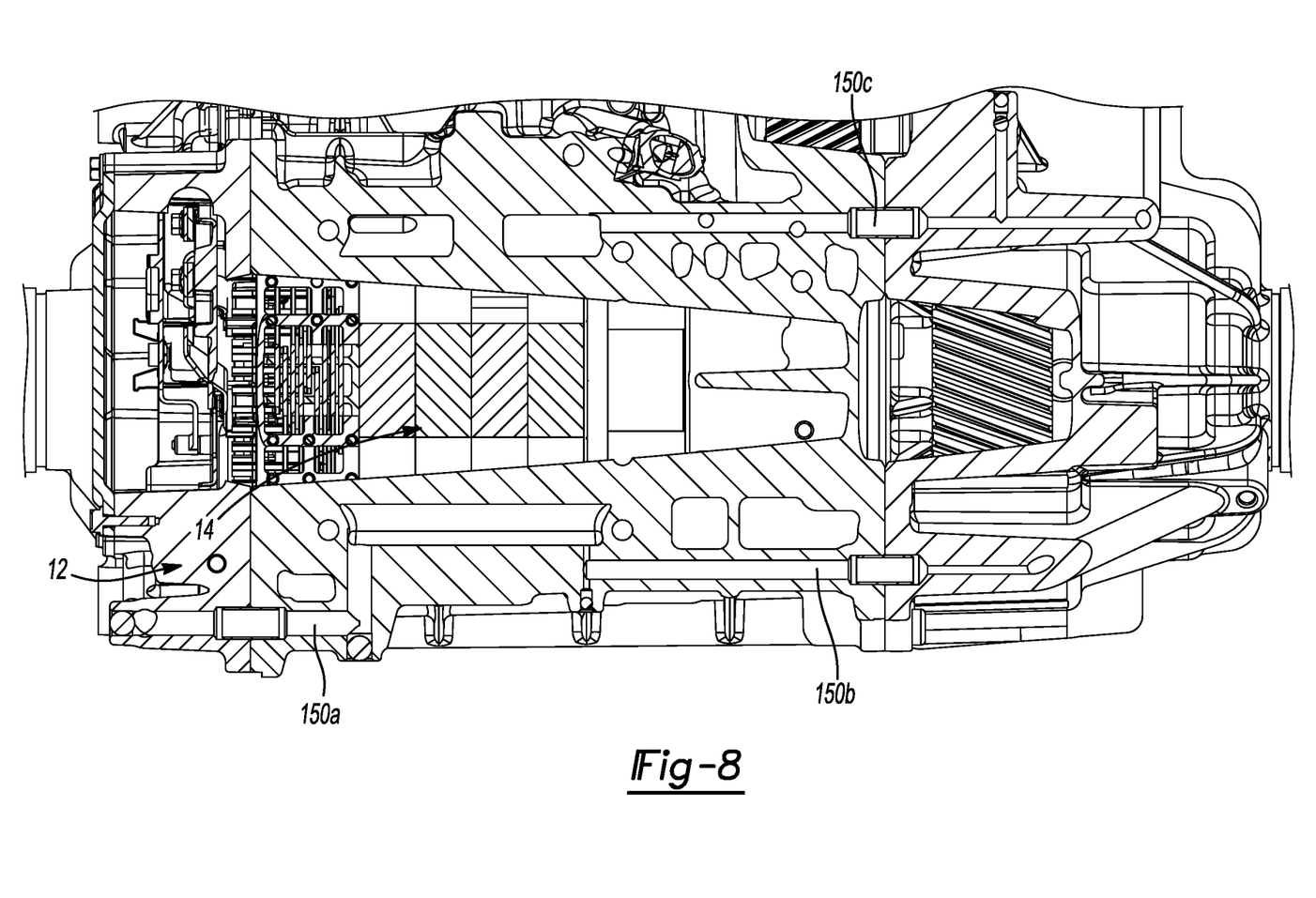
FIG. 8 is a section view taken through the electric drive unit of FIG. 1 illustrating several of the lubricant supply galleries.

Lubricant that is discharged from the second gallery 140 can be directed within the upper reservoir 34 in a desired manner by various features or structures that can be integrated into the upper reservoir 34. For example, the upper reservoir 34 can be configured with a contoured bottom surface 170, and features, such as a discharge chute 172 and/or a plurality of flow dividers 174, can be received in the upper reservoir 34. In example shown, the bottom surface 170 of the upper reservoir 34, which is formed by the wall member 38 of the housing assembly 12, is formed as a portion of a right cylinder that is recessed within a volume that is bounded by a pair of lateral end walls 190*a* and 190*b* and a pair of axial end walls 192*a* and 192*b*. Accordingly, the upper reservoir 34 is shallowest along a plane that extends through the centerline of a right cylinder that defines bottom surface 170 and is deepest where the bottom surface intersects the lateral end walls 190*a* and 190*b*. The wall member 38 of the housing assembly 12 can define one or more bosses 200 proximate each of the axial end walls 192*a* and 192*b* through which the lubricant supply galleries 150*d* can be formed. The bosses 200 are configured to set or establish the height at which the lubricant supply galleries 150*d* intersect the upper reservoir 34. The discharge chute 172 can be integrated into the lateral end wall 190*a* and the wall member 38 of the housing assembly 12 and can be disposed about and in-line with the second gallery 140 to receive lubricant that is discharged therefrom. The discharge chute 172 can direct lubricant exiting the second gallery 140 in a lateral direction (i.e., toward the lateral end wall 190*b*). The flow dividers 174 are configured to intersect portions of the flow of the lubricant that is discharged from the discharge chute 172 and to direct those portions in respective directions toward the lateral end wall 190*a* and an associated one of the axial end walls 192*a* and 192*b* and/or toward the lubricant supply gallery 150*c*. It will be appreciated that the flow dividers 174 are spaced apart from one another or configured such that a portion of the flow of the lubricant that is discharged from the discharge chute 172 will pass through the flow dividers 174 to a region that is laterally between the flow dividers 174 and the lateral end wall 190*b*. Depending on the velocity of the lubricant that passes through the flow dividers 174, it is possible that the lubricant will strike or impinge upon the lateral end wall 190*b* and return toward the flow dividers 174. If desired, the flow dividers 174 can be configured to direct the returning lubricant in a desired manner, such as laterally toward the lateral end wall 190*b* and axially toward a respective one of the axial end walls 192*a* and 192*b* and/or toward a respective one of the lubricant supply galleries 150*a* and 150*b*.

It will be appreciated that the bottom surface 170 of the upper reservoir 34 could be further contoured to promote lubricant to flow over and drain toward desired areas. For example, the bottom surface 170 of the upper reservoir 34 could be contoured (e.g., tapered) in part or in whole so that lubricant in the upper reservoir 34 drains toward the axial end walls 192*a* and 192*b*.

Returning to FIGS. 2 and 6, the electric motor 14 is positioned in the first cavity 30 of the housing assembly 12 at a location where a portion of the field windings 52 of the stator 40 are disposed at or beneath a lubricant level 250 that is established by the lubricant in the sump 36 when the electric drive unit 10 is operated in a nominal orientation (i.e., the orientation of the electric drive unit 10 when it is integrated into a vehicle and the vehicle is operated on flat, level ground). The lubricant level 250 in the sump 36 does not intersect the rotor 42 so that the lubricant in the sump 36 does not create drag on the rotor 42 as the electric drive unit 10 is operated through a predetermined range of roll about a longitudinal vehicle axis that is perpendicular to the rotational axis 56. It will be appreciated that submersion of a portion of the field windings 52 of the stator 40 in the lubricant in the sump 36 provides enhanced cooling of the electric motor 14.

Figure 9:
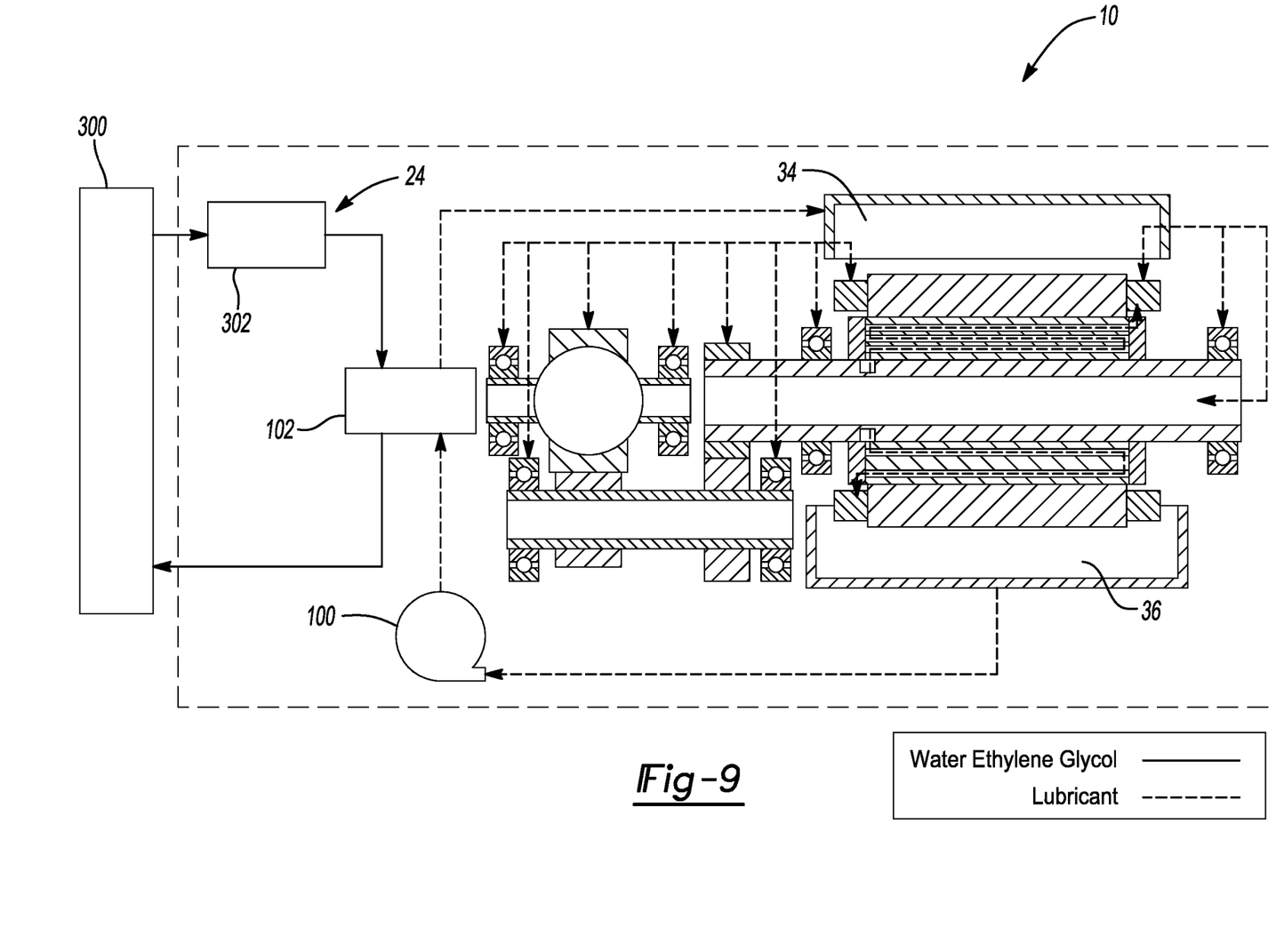
FIG. 9 is a schematic view of the electric drive unit of FIG. 1 as integrated into a vehicle environment.
Figure 10:
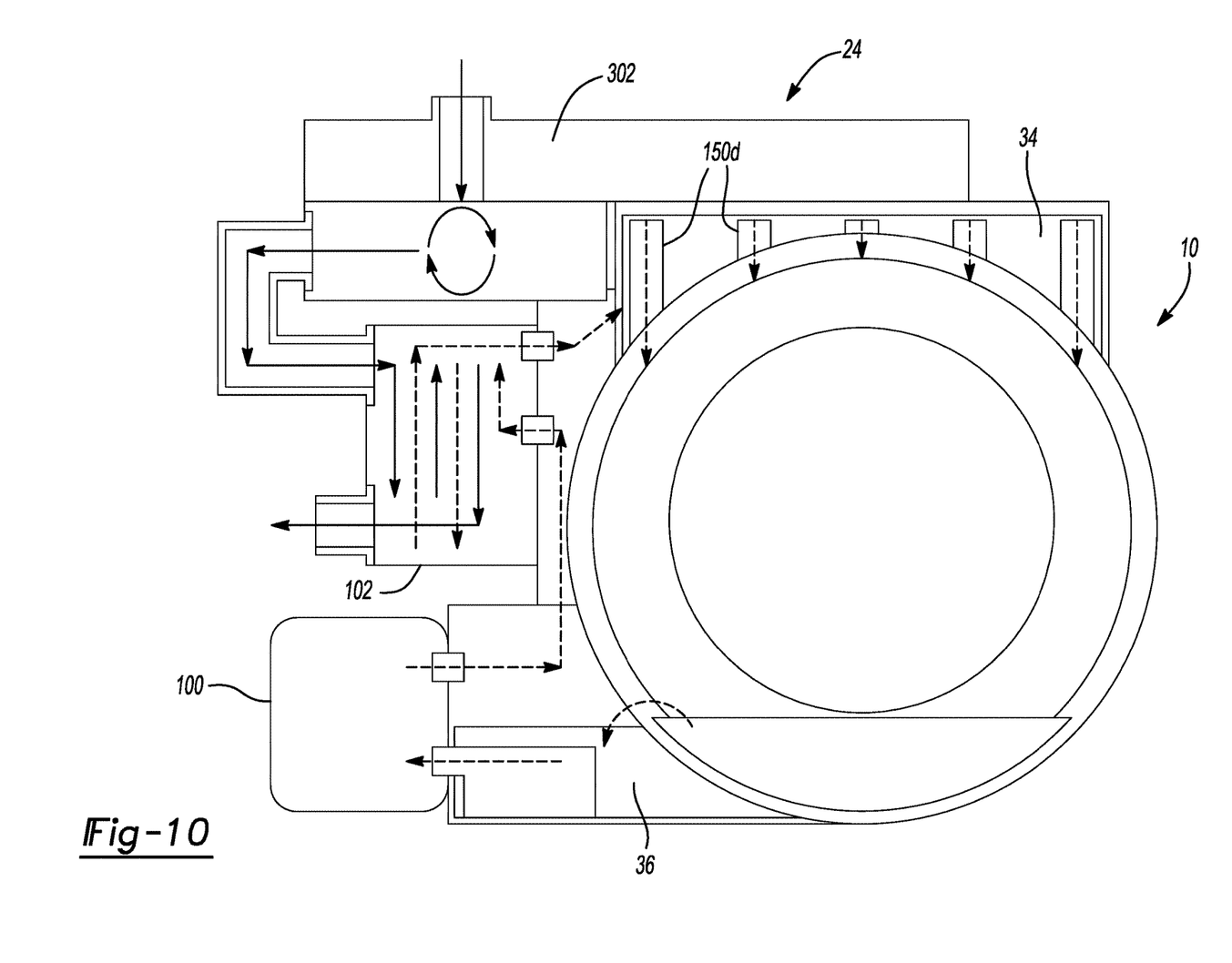
FIG. 10 is a schematic cross-sectional view of the electric drive unit of FIG. 1.

In FIGS. 9 and 10, the electric drive unit 10 is shown schematically as being integrated into a vehicle environment. The vehicle 300 can provide a supply of an appropriate coolant, such as a water-ethylene glycol mixture, that can be routed through the inverter 302 of the control unit 24 and through the heat exchanger 102 to transport heat away from the inverter 302 and the heat exchanger 102. The fluid pump 100 draws lubricant, which could be a type of automatic transmission fluid, from the sump 36 and circulates the lubricant through the heat exchanger 102. Cooled lubricant that passes out of the heat exchanger 102 is discharged into the upper reservoir 34.

Figure 11:
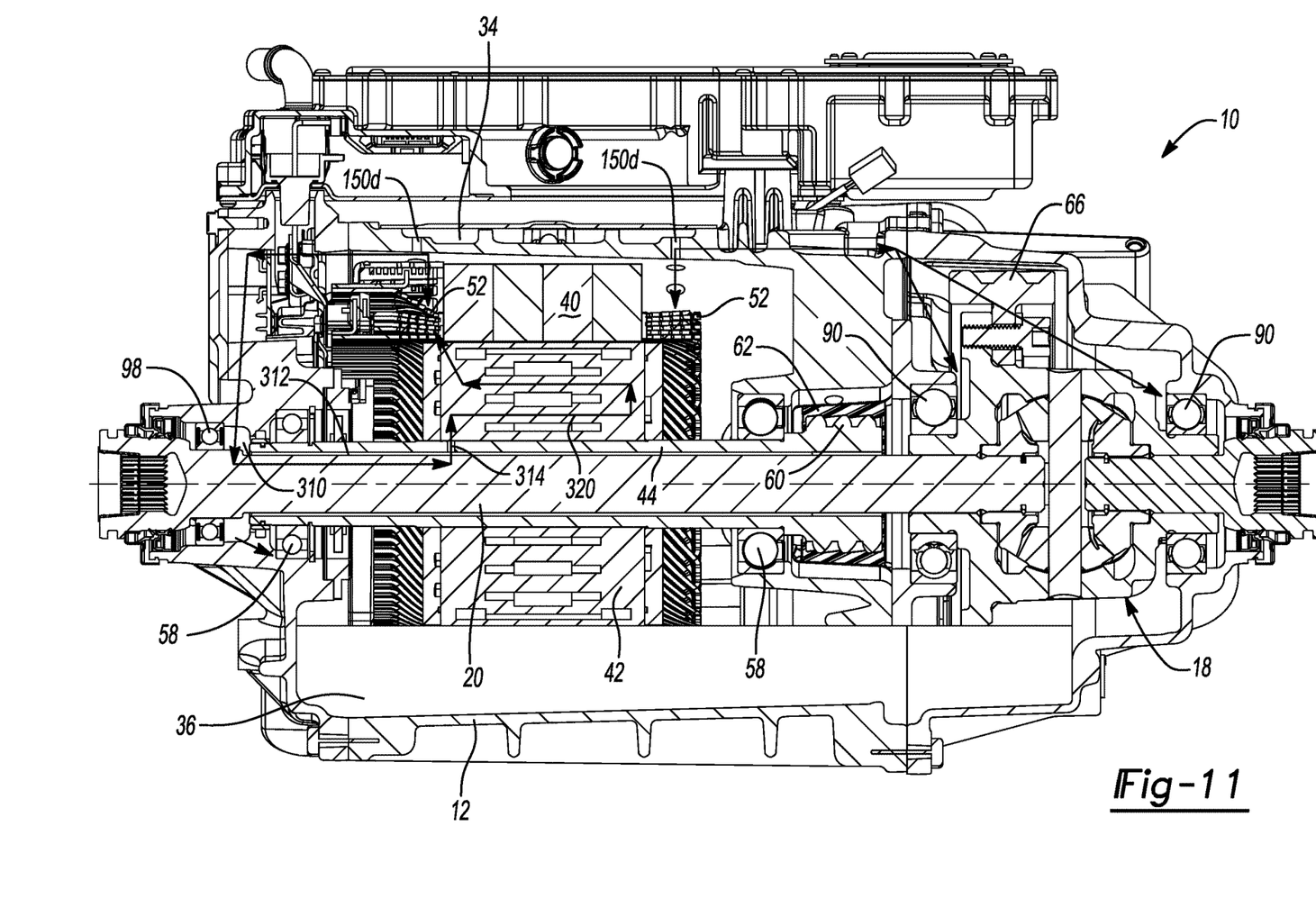
FIG. 11 is a cross-sectional view of the electric drive unit of FIG. 1 illustrating the distribution of a lubricating oil through the electric drive unit for lubrication and cooling purposes.

In FIGS. 10 and 11, cooled lubricant in the upper reservoir 34 is discharged from the lubricant supply galleries 150*a*, 150*b* and 150*c* (FIG. 7) to lubricate the differential support bearings 90, the motor output shaft bearings 58, the output shaft bearing 98, the mating teeth of the input pinion 60 and the first intermediate gear 62, the mating teeth of the second intermediate gear 64 (FIG. 3) and the output gear 66, and the differential assembly 18, while lubricant from the lubricant supply galleries 150*d* can be employed to cool the field windings 52 of the stator 40. Moreover, a portion of the lubricant that is discharged from the upper reservoir 34 through the lubricant supply gallery 150*a* (FIG. 7) can be directed to an annular reservoir 310 that is formed in the housing assembly 12 about the first output shaft 20. Lubricant in the annular reservoir 310 can be discharged into an annular space 312 that is disposed radially between the first output shaft 20 and the motor output shaft 44. Lubricant in the annular space 312 can be discharged through one or more feed apertures 314 that are formed radially through the motor output shaft 44 and can enter one or more fluid passages 320 that are formed in the rotor 42. The fluid passages 320 in the rotor can be formed in any desired manner, but in the example provided are formed with a plurality of axial passage segments, which are formed axially through a portion of the rotor 42, and a plurality of radial passage segments, each of which interconnects a pair of the axial passage segments. The fluid passage(s) 320 in the rotor 42 can terminate at an outer circumferential surface of the rotor 42 and can be located in a desired position so that lubricant discharged from the fluid passage(s) 320 can be slung from the rotor 42 toward a desired target, such as an axial end of the field windings 52 of the stator 40. In operation of the electric drive unit 10, centrifugal force acting on the lubricant in the rotor 42 can aid in drawing lubricant from the annular space 312 into the fluid passage(s) 320 and through the fluid passage(s) 320.

With reference to FIGS. 1, 2 and 7, the cooling and lubrication system 26 has been illustrated and described thus far as having a plurality of lubricant supply galleries that provide a flow of lubricant under gravity feed to various components of the electric drive unit 10 to lubricate and/or cool those components. However, it will be appreciated that the electric drive unit 10 could be configured somewhat differently. For example, the cooling and lubrication system 26 could be configured to provide pressurized fluid to various ones of the lubricant supply galleries, to lubricate and/or cool certain components of the electric drive unit 10 with pressurized lubricant, and to utilize the upper reservoir 34 to supply lubricant to the remaining lubricant supply galleries so that the gravity feeding of lubricant can be accomplished via these remaining lubricant supply galleries. For example, one or more of the lubricant supply galleries 150*a*, 150*b* and 150*c* could be fluidly coupled to the second gallery 140 to receive pressurized lubricant therefrom and a suitable device (not shown), such as a flow restrictor or a pressure relief valve, could be positioned in the second gallery 140 to provide lubricant to the upper reservoir 34 while limiting a loss of pressure to the lubricant supply gallery/galleries that receive pressurized lubricant from the second gallery 140. Additionally or alternatively, one or more flow restrictors (not shown) could be employed in any of the lubricant supply galleries that receive pressurized lubricant, and/or any of the galleries that provide pressurized lubricant to one or more of the lubricant supply galleries that receive pressurized lubricant.

Figure 12:
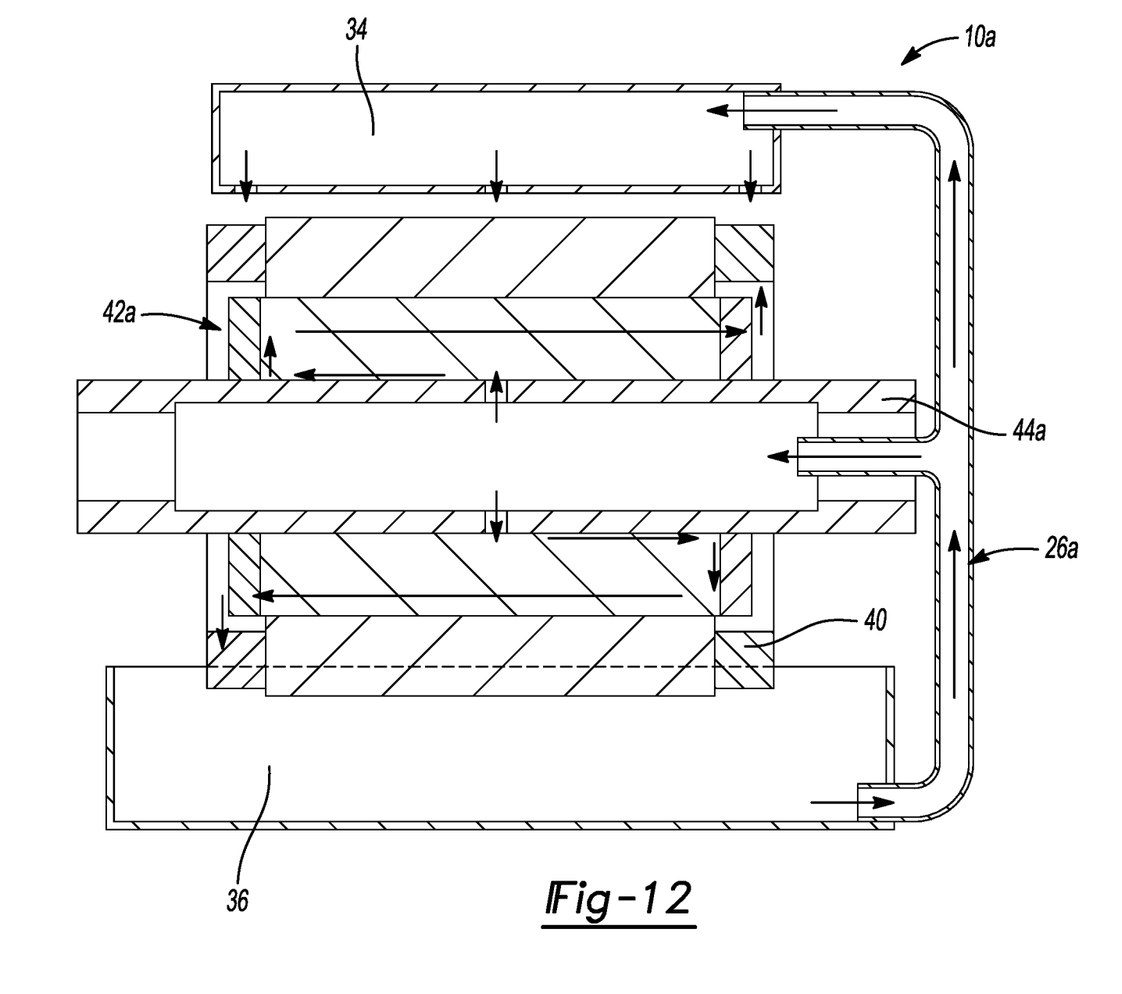
FIG. 12 is a schematic illustration of a second electric drive unit constructed in accordance with the teachings of the present disclosure.

In the example of FIG. 12, the cooling and lubrication system 26*a* is configured to provide pressurized lubricant to the rotor 42a during the operation of the electric drive unit 10a, as well as to supply the upper reservoir 34a with lubricant. One or more flow restricting devices could be employed in the cooling and lubrication system 26a to control the flow of lubricant to the rotor 42a and/or the upper reservoir 34a. In the particular example provided, the cooling and lubrication system 26a provides a flow of pressurized lubricant to a radially inward location of the rotor 42a, such as between the motor output shaft 44a and the first output shaft (not specifically shown), and the lubricant is thereafter directed through the rotor 42a in a radially outward direction as a result of the fluid pressure of the lubricant and/or through centrifugal force. Lubricant can exit the rotor 42a from a radially outward surface of the rotor 42a and can be directed against the radially inward surfaces of the stator 40 to provide additional cooling to the stator 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
a housing assembly that defines a first cavity, a second cavity, a sump and an upper reservoir, the sump being coupled in fluid communication with the first cavity, the upper reservoir being spaced apart from the sump and the first cavity;
an electric motor received in the first cavity, the electric motor having a stator, a rotor and a motor output shaft, the stator having a stator core, which is fixedly coupled to the housing assembly, and a plurality of windings, the rotor being received within the stator and being rotatable about a rotational axis, the motor output shaft being coupled to the rotor for rotation therewith about the rotational axis;
a differential assembly in the second cavity, the differential assembly having a differential input member, which is rotatable relative to the housing assembly, and first and second differential output members that are rotatable relative to the differential input member;
a first output shaft that is coupled to the first differential output member for rotation therewith;
a second output shaft that is coupled to the second differential output member for rotation therewith;
a transmission received in the second cavity, the transmission being configured to transmit rotary power between the motor output shaft and the differential input member; and
a fluid pump that is configured to draw a lubricant from the sump and provide a flow of the lubricant;
wherein at least a portion of the flow of the lubricant is discharged into the upper reservoir;
wherein the housing assembly defines a plurality of first lubricant supply galleries and a plurality of second lubricant supply galleries, each of the first and second lubricant supply galleries being a conduit that permits lubricant in the upper reservoir to drain due to gravity to an associated component of the electric drive unit to lubricate and/or cool the associated component;
wherein the first lubricant supply galleries intersect the upper reservoir at an associated location that is less than or equal to a first height dimension, wherein the second lubricant supply galleries intersect the upper reservoir at a corresponding location that is greater than or equal to a second height dimension, the second height dimension being larger than the first height dimension.

2. The electric drive unit of claim 1, wherein at least a portion of the second lubricant supply galleries are configured to direct lubricant onto a portion of the stator.

3. The electric drive unit of claim 2, wherein the portion of the stator comprises the windings.

4. The electric drive unit of claim 1, wherein each of at least a portion of the first lubricant supply galleries provides lubricant to an associated bearing.

5. The electric drive unit of claim 4, further comprising first and second motor output shaft bearings mounted to the housing assembly and supporting the motor output shaft for rotation relative to the housing assembly.

6. The electric drive unit of claim 4, further comprising first and second differential bearings mounted to the housing assembly and supporting the differential input member for rotation relative to the housing assembly.

7. The electric drive unit of claim 4, further comprising first and second output shaft bearings, the first output shaft bearing being mounted to the housing assembly and supporting the first output shaft for rotation relative to the housing assembly, the second output shaft bearing being mounted to the housing assembly and supporting the second output shaft for rotation relative to the housing assembly.

8. The electric drive unit of claim 4, wherein the transmission includes an input pinion, which is coupled to the motor output shaft for rotation therewith, an output gear, which is rotatably coupled to the differential input member, a first intermediate gear, which is meshingly engaged with the input pinion, a second intermediate gear, which is rotatably coupled to the first intermediate gear and meshingly engaged with the output gear, and a pair of intermediate gear bearings that are mounted to the housing assembly and support the first and second intermediate gears for rotation relative to the housing assembly.

9. The electric drive unit of claim 1, wherein the first and second output shafts are rotatable about the rotational axis.

10. The electric drive unit of claim 1, wherein the differential input member is a differential case.

11. The electric drive unit of claim 10, wherein the first and second differential output members are side gears.

12. The electric drive unit of claim 11, wherein the differential assembly includes a plurality of differential pinions, each of the differential pinions being meshingly engaged to both of the side gears.

13. The electric drive unit of claim 1, wherein a portion of the flow of the lubricant is directed into the rotor.

14. The electric drive unit of claim 1, further comprising at least one flow divider disposed in the upper reservoir, each of the at least one flow divider being disposed at a location that intersects a portion of the flow of lubricant that is discharged into to the upper reservoir and directs the intersected portion of flow of lubricant to a desired area within the upper reservoir.

15. The electric drive unit of claim 14, wherein the desired area within the upper reservoir includes an area proximate at least one of the first lubricant supply galleries.

16. The electric drive unit of claim 15, further comprising a discharge chute received in the upper reservoir, the discharge chute directing the flow of lubricant that is discharged into the upper reservoir generally toward the at least one flow divider.

17. The electric drive unit of claim 16, wherein the at least one flow divider comprises two flow dividers are spaced apart from one another, and wherein the discharge chute directs the flow of lubricant that is discharged into to the upper reservoir against each of the two flow dividers as well as into a space between the two flow dividers.

18. The electric drive unit of claim 1, further comprising a cover coupled to the housing and closing the upper reservoir, wherein the cover is disposed at a third height dimension that is greater than the second height dimension, and wherein the second lubricant supply galleries intersect the upper reservoir in a manner that provides even flow distribution from the upper reservoir to the first and second lubricant supply galleries during vehicle maneuvers.

19. The electric drive unit of claim 1, wherein each of the first lubricant supply galleries is configured to pass lubricant therethrough at a predetermined rate.

\* \* \* \* \*